US012690678B2

(12) United States Patent
Sarimaa et al.

(10) Patent No.: US 12,690,678 B2
(45) Date of Patent: Jul. 28, 2026

(54) BED BUG MONITORING FURNITURE LEG

(71) Applicant: VALPAS ENTERPRISES OY, Helsinki (FI)

(72) Inventors: Vertti Sarimaa, Helsinki (FI); Aku Viskari, Helsinki (FI); Martim Gois, Helsinki (FI)

(73) Assignee: VALPAS ENTERPRISES OY, Helsinki (FI)

( * ) Notice: Subject to any disclaimer, the term of this patent is extended or adjusted under 35 U.S.C. 154(b) by 403 days.

(21) Appl. No.: 16/308,269

(22) PCT Filed: Jun. 1, 2017

(86) PCT No.: PCT/FI2017/050410
§ 371 (c)(1),
(2) Date: Dec. 7, 2018

(87) PCT Pub. No.: WO2017/212112
PCT Pub. Date: Dec. 14, 2017

(65) Prior Publication Data
US 2019/0261775 A1      Aug. 29, 2019

(30) Foreign Application Priority Data

Jun. 8, 2016      (FI) ...................................... 20165475

(51) Int. Cl.
A47B 91/14          (2006.01)
A01M 1/02          (2006.01)
(Continued)

(52) U.S. Cl.
CPC ............. A47B 91/14 (2013.01); A01M 1/026 (2013.01); A01M 1/103 (2013.01); A47C 19/024 (2013.01)

(58) Field of Classification Search
CPC ....... A47B 91/14; A01M 1/023; A01M 1/026; A01M 1/04; A01M 1/103
See application file for complete search history.

(56) References Cited

U.S. PATENT DOCUMENTS 240,391 A  *  4/1881  Custer ................... A01M 29/34
                                                      43/109
423,190 A  *  3/1890  Stillman ............... A01M 29/34
                                                      43/109
(Continued)

FOREIGN PATENT DOCUMENTS

GB          647301 A      12/1950
GB          2524307 A      9/2015
(Continued)

OTHER PUBLICATIONS

International Search Report issued in International Application No. PCT/FI2017/050410, dated Sep. 1, 2017, 3 pages.
(Continued)

*Primary Examiner* — Michael H Wang
(74) *Attorney, Agent, or Firm* — Eversheds Sutherland (US) LLP

(57)          ABSTRACT

A monitoring device for insects such as bed bugs comprising: an elongated member constituting a furniture leg, wherein said elongated member comprises: a space inside the elongated member comprising a trap for insects, at least one opening in the leg wherein insects may enter the trap, the opening being connected to the trap by pathway that is inclined and slippery such that the bed bugs entering the opening slide to the trap. Corresponding arrangement and method for bed bug monitoring are also presented.

13 Claims, 6 Drawing Sheets

Figure 1:
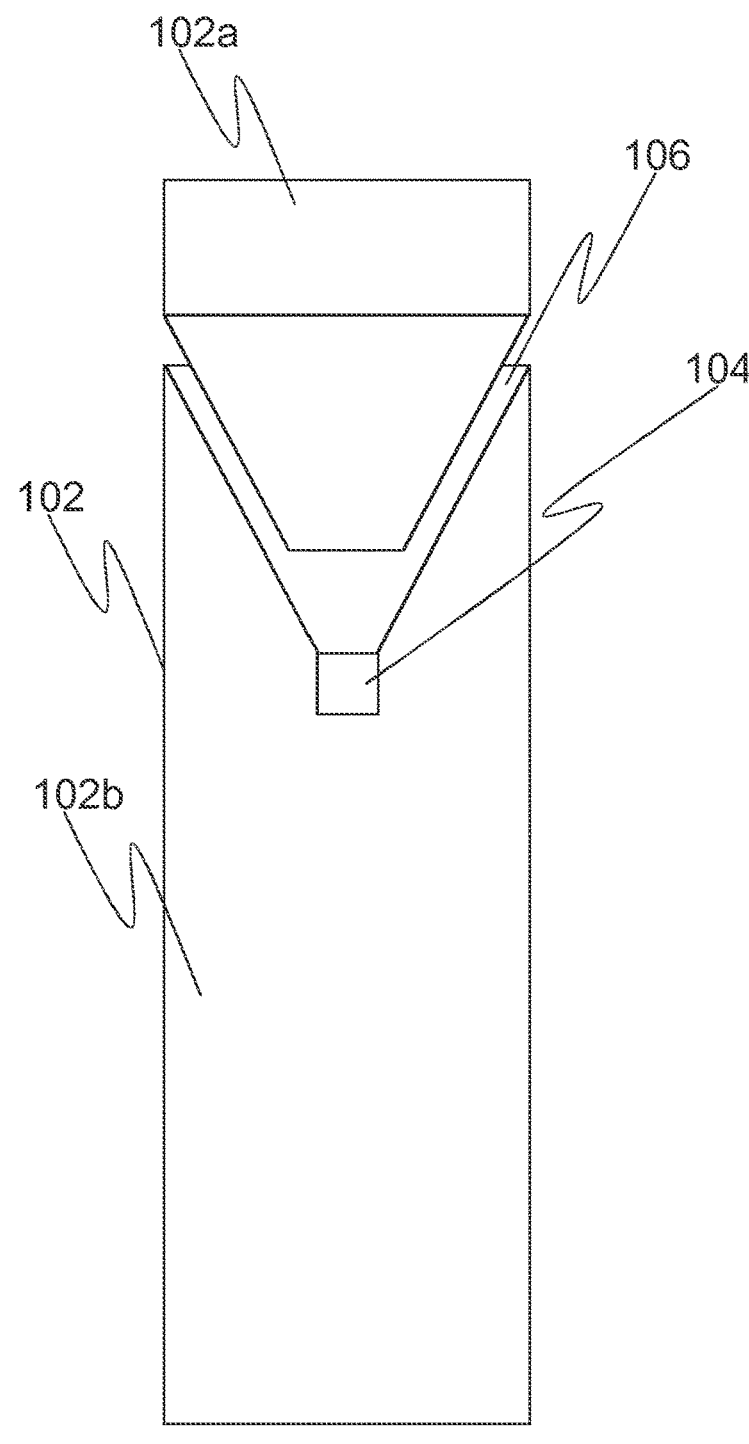

(51) Int. Cl.
  *A01M 1/10*        (2006.01)
  *A47C 19/02*       (2006.01)

(56)              References Cited

U.S. PATENT DOCUMENTS

|  |  |  |  |  |
|---|---|---|---|---|
| 431,815 | A | * | 7/1890 | Linder .................. A01M 29/34 |
|  |  |  |  | 43/109 |
| 694,738 | A | * | 3/1902 | Goldberg .............. A01M 29/34 |
|  |  |  |  | 43/109 |
| 1,093,291 | A | * | 4/1914 | Quist .................... A01M 29/34 |
|  |  |  |  | 43/109 |
| 1,213,638 | A | * | 1/1917 | Henderson ............ A01M 29/34 |
|  |  |  |  | 43/109 |
| 1,218,595 | A | * | 3/1917 | Chalupa ................ A01M 29/34 |
|  |  |  |  | 43/109 |
| 1,305,553 | A | * | 6/1919 | Kruse ................... A01M 29/34 |
|  |  |  |  | 43/109 |
| 1,390,734 | A | * | 9/1921 | Leo ....................... A01M 29/34 |
|  |  |  |  | 43/109 |
| 1,471,630 | A | * | 10/1923 | Parrella ................ A01M 29/34 |
|  |  |  |  | 43/109 |
| 1,684,279 | A | * | 9/1928 | Humphrey ............ A01M 29/34 |
|  |  |  |  | 43/109 |
| 1,800,613 | A | * | 4/1931 | Farrell ................. A01M 29/34 |
|  |  |  |  | 43/109 |
| 2,060,931 | A | * | 11/1936 | Fischer .................. A47B 91/14 |
|  |  |  |  | 43/109 |
| 5,042,192 | A | * | 8/1991 | Osteen .................. A01M 29/34 |
|  |  |  |  | 43/109 |
| 7,591,099 | B2 | * | 9/2009 | Lang ..................... A01M 1/026 |
|  |  |  |  | 43/107 |
| 2001/0042338 | A1 | * | 11/2001 | Jackson ................ A01M 29/34 |
|  |  |  |  | 43/121 |
| 2009/0282728 | A1 | * | 11/2009 | McKnight ............. A01M 29/30 |
|  |  |  |  | 43/109 |
| 2013/0318861 | A1 | * | 12/2013 | Roeder ................. A01M 1/026 |
|  |  |  |  | 43/123 |
| 2015/0305318 | A1 |  | 10/2015 | Moriarty |

FOREIGN PATENT DOCUMENTS

| WO | 2008/051501 A2 | 5/2008 |
|---|---|---|
| WO | 2014/126809 A2 | 8/2014 |

OTHER PUBLICATIONS

Office Action issued in Chinese Patent Application No. 2017800477402, dated Dec. 18, 2020, 15 pages, with English translation.
Search Report issued in Chinese Patent Application No. 2017800477402, dated Dec. 10, 2020, 3 pages.

* cited by examiner

100

300

400

500

BED BUG MONITORING FURNITURE LEG

CROSS-REFERENCE TO RELATED APPLICATIONS

This application is a national stage application, filed under 35 U.S.C. § 371, of International Application No. PCT/FI2017/050410, filed on Jun. 1, 2017, titled "Bed Bug Monitoring Furniture Leg," which claims priority to Finland Patent Application No. 20165475, filed on Jun. 8, 2016, the entire contents of each of which are hereby incorporated herein by reference in their entirety for all purposes.

FIELD OF THE INVENTION

Generally the present invention relates to arrangements for monitoring and trapping insects. Particularly, however not exclusively, the invention pertains to bedbug monitoring arrangements.

BACKGROUND

Bed bugs (also bed-bugs and bedbugs) are parasitic insects that feed exclusively on blood. They are a particular nuisance to people since they usually feed nocturnally without being noticed. In many cases individual bites may not even show any visible traces but usually a plurality of bites in a small may cause reddishness, swelling, itchy welts, inflammation and even allergic reactions in addition to being known to carry diseases.

The bed bugs have been around in human sediments for thousands of years but in the recent years their distribution and prevalence also in the developed countries has been increasing. This has brought them again into the attention of the wider public and the markets for bed bug control and the number of solutions thereof grow increasingly.

The particular difficulty to remedy an infestation is to successfully eradicate all of the insects and their eggs. Usually this requires the use of poisonous pesticides or a high temperature treatment inflicted widely and over a long period of time. Hence, being able to positively detect and assess a potential infestation including its magnitude and widespreadness is key for optimal treatment of the problem. This is important not only for getting rid of the insects but also for providing a correct diagnosis for a person suffering from any of the aforementioned ailments.

However, as briefly mentioned detecting bed bugs is very difficult and requires finesse. The insects are mainly nocturnal, very small and they can survive even a year without a meal. Further, they may live in various crevices between clothes, sheets, furniture, floorboards and baseboards, which are often difficult to be exhaustively checked. Bed bugs also spread easily from outside, such as from stores, gyms and hotels.

Clearly bed bug detection may take time and resources and it is very laborious and inefficient to be done manually. In many cases manually detecting signs of fecal matter and skin casts imply bed bugs have been present although this is not enough to confirm that they still are present. Some traps and detection devices have been proposed in the prior art but none of them have been able to propose a comprehensive solution to detecting and capturing bed bugs, which is also scalable, cost-efficient and smart.

Some prior art solutions are hereinafter presented. US 2001042338 A1 discloses an insect deterring support, which prevents insects from crawling to a structure holding food, water or the like. WO 2008051501 A2 discloses a detection arrangement, which utilizes sensors for detecting bedbugs on the basis of detected nitrophorin. GB 2524307 A generally relates to an apparatus for indicating pest activity. WO 2014125158 A1 generally relates to a method and an apparatus for imaging arthropods. U.S. Pat. No. 5,042,192 A discloses a support with barriers for crawling creatures in general. US 2008017775 A1 discloses a disk barrier for preventing crawling pest from climbing up furniture.

SUMMARY OF THE INVENTION

The objective of the embodiments of the present invention is to at least alleviate the aforementioned drawbacks evident in the prior art arrangements particularly in the context of monitoring and trapping bed bugs. The objective is generally achieved with a device and corresponding arrangement and method in accordance with the present invention.

One of the main advantages of the present invention is that it may be arranged to connect to any desired furniture, which utilizes furniture legs. Even further, the integration level of the solution makes it barely noticeable and convenient to use.

One of the main advantages of the present invention is that it enables real-time monitoring of bed bugs, which not only makes manual inspection and mistakes thereof virtually obsolete but also makes it possible for people with no expertise to monitor and detect bed bugs. Such people are e.g. hotel staff, campus staff, cleaners, landlords and other property managers and caretakers as well as regular people. The solution allows for remote monitoring and controlling, which is also convenient for contemporary usability standards.

Another advantage of the present invention is that is simple in structure. This makes it scalable and cost-efficient terms in manufacturing. Even further, it is easy and safe to use as it doesn't require any harmful chemicals or pesticides. Further, the solution utilizes an opening that acts as a natural inducement for insects as they naturally seek to get into crevices and the like.

Further, the arrangement of the present invention allows for detecting the occurrence and estimating the magnitude of the bed bug infestation, which may be used to optimize the extermination process.

Although bed bugs are essentially in the focus of the invention the trap is suitable for other insects such as fur and carpet beetles as well as other pests and insects typically found in household conditions.

In accordance with one aspect of the present invention a monitoring device for insects such as bed bugs comprising:

an elongated member constituting a furniture leg, wherein said elongated member comprises:

a space inside the elongated member comprising a trap for insects, at least one opening in the elongated member wherein insects may enter the trap, the opening being connected to the trap by pathway that is inclined and slippery such that the bed bugs entering the opening slide to the trap.

According to an exemplary embodiment of the present invention the opening extends around the elongated member and disconnects the elongated member outer surface to two outer surfaces. This creates a zone which the bed bugs cannot cross over without entering the opening and traveling to the trap.

According to an exemplary embodiment of the present invention the trap comprises or constitutes a part, which is removably fixed to the elongated member. This allows the trap to be emptied and/or checked for insects in the trap.

According to an exemplary embodiment of the present invention the elongated member comprises an upper part and lower part, which parts may be removable from each other.

According to an exemplary embodiment of the present invention the elongated member comprises an attractant color or scent on the surface of the elongated member.

According to an exemplary embodiment of the present invention the monitoring device comprises at least one gripping structure on the surface of the elongated member, which gripping structure may enable at least partly only unidirectional movement along the elongated member.

According to an exemplary embodiment of the present invention the monitoring device comprises sensor means for detecting the presence of an insect inside or in the vicinity of the trap.

According to an exemplary embodiment of the present invention the device comprises an indicator for signaling a detected bed bug inside the trap.

According to an exemplary embodiment of the present invention the monitoring device comprises a transmitter to send signals of detected insects, optionally towards a mobile device or a remote entity, such as a cloud server. The transmitter is preferably a wireless transmitter.

According to an exemplary embodiment of the present invention the device may also comprise chemical attractant in the vicinity or inside the trap.

According to an exemplary embodiment of the present invention the device also comprises a visual lure in the vicinity or inside the trap.

In accordance with another aspect of the present invention an arrangement utilizing the monitoring device of the present invention for insects such as bed bugs comprising:

at least one bed bug monitoring device, comprising means to detect bed bugs, said monitoring device being situated as a leg of a piece of furniture,
  a communication module, comprising means to obtain detection signals from said bed bug monitoring devices and further to send said signals towards a remote entity.

According to an exemplary embodiment of the present invention the arrangement comprises a remote server, mobile device, computer terminal or remote server, arranged to obtain the detection signals and to determine the type and/or amount of the bed bugs and/or to determine an action for extermination.

According to an exemplary embodiment of the present invention the communication module may facilitate wireless communication. The communication module may be in any of the devices or it may essentially be a separate device. The communication module may further comprise means to process and/or store received detection signals from said bed bug monitoring devices. Optionally additionally the communication module may constitute or be comprised in a device, which device further comprises the means to provide a reading of the received, and optionally processed, signals to a user e.g. via a display or other user interface means.

According to an exemplary embodiment of the present invention the arrangement comprises a plurality of bed bug monitoring devices wherein the bed bug monitoring devices are arranged as all the feet or stands of furniture, such as a bed, table or chair.

In accordance with one aspect of the present invention a method for monitoring bed bugs utilizing at least one bed bug monitoring device of the present invention comprising:

attaching a bed bug monitoring device as the leg of a piece of furniture, such as that bed bugs cannot travel along said leg to or from the piece of furniture without being trapped in said monitoring device,
  detecting bed bugs traveling to or caught in the monitoring device,
  sending data or signal representing information about the detected bed bugs towards a remote device.

According to an exemplary embodiment of the present invention the method further comprises determining the type and/or amount of the bed bugs and determining a corresponding action for extermination.

The previously presented considerations concerning the various embodiments of the device may be flexibly applied to the embodiments of the arrangement and method mutatis mutandis and vice versa, as being appreciated by a skilled person. Similarly, the device, arrangement and method are scalable in the limitations of the corresponding entities of the aspects of the present invention.

As briefly reviewed hereinbefore, the utility of the different aspects of the present invention arises from a plurality of issues depending on each particular embodiment.

The expression "a number of" may herein refer to any positive integer starting from one (1). The expression "a plurality of" may refer to any positive integer starting from two (2), respectively.

The term "exemplary" refers herein to an example or example-like feature, not the sole or only preferable option.

Different embodiments of the present invention are also disclosed in the attached dependent claims.

BRIEF DESCRIPTION OF THE RELATED DRAWINGS

Figure 2A:
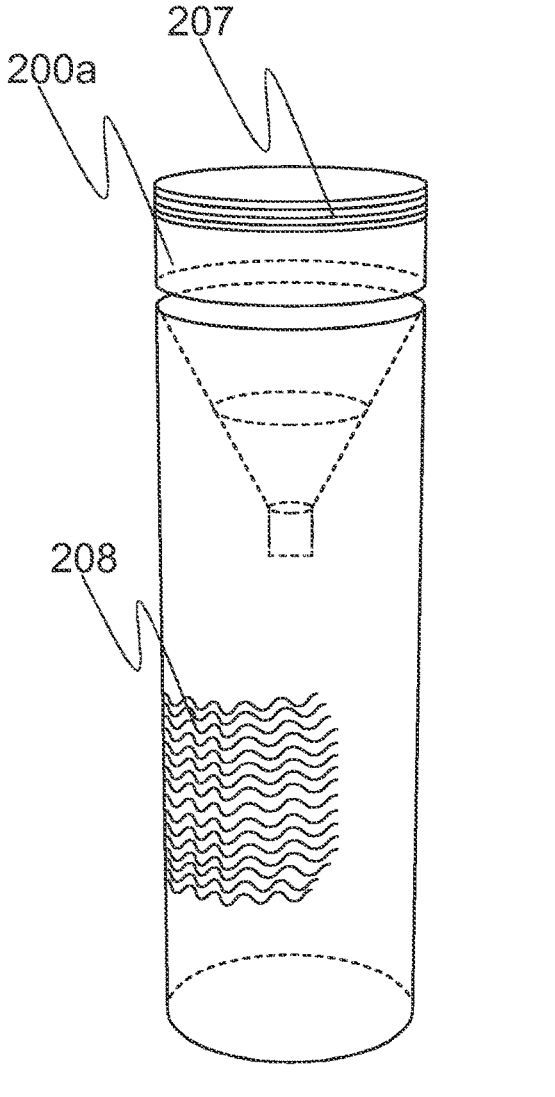
Figure 2B:
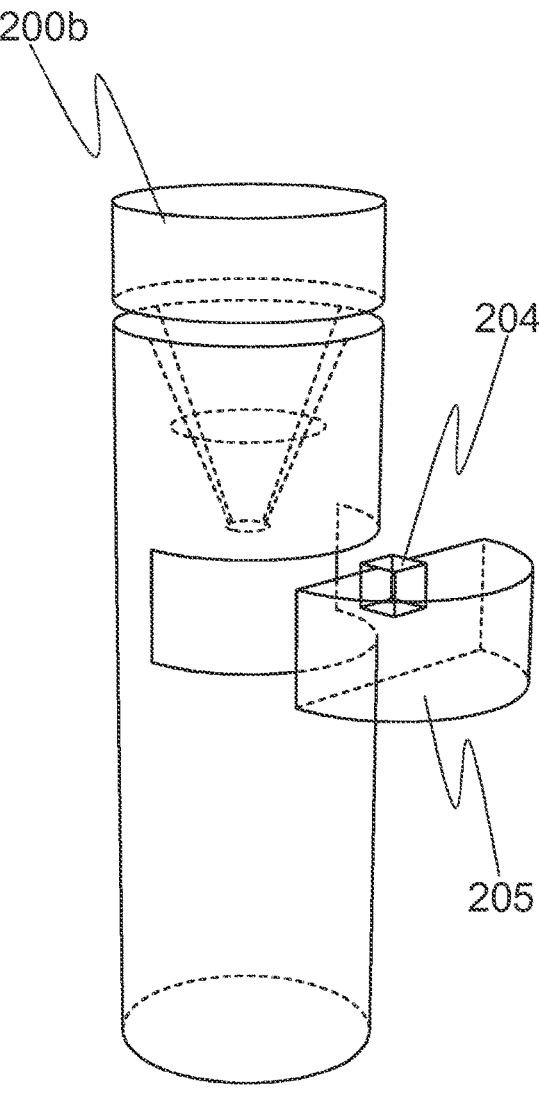
Figures 2C, 2D:
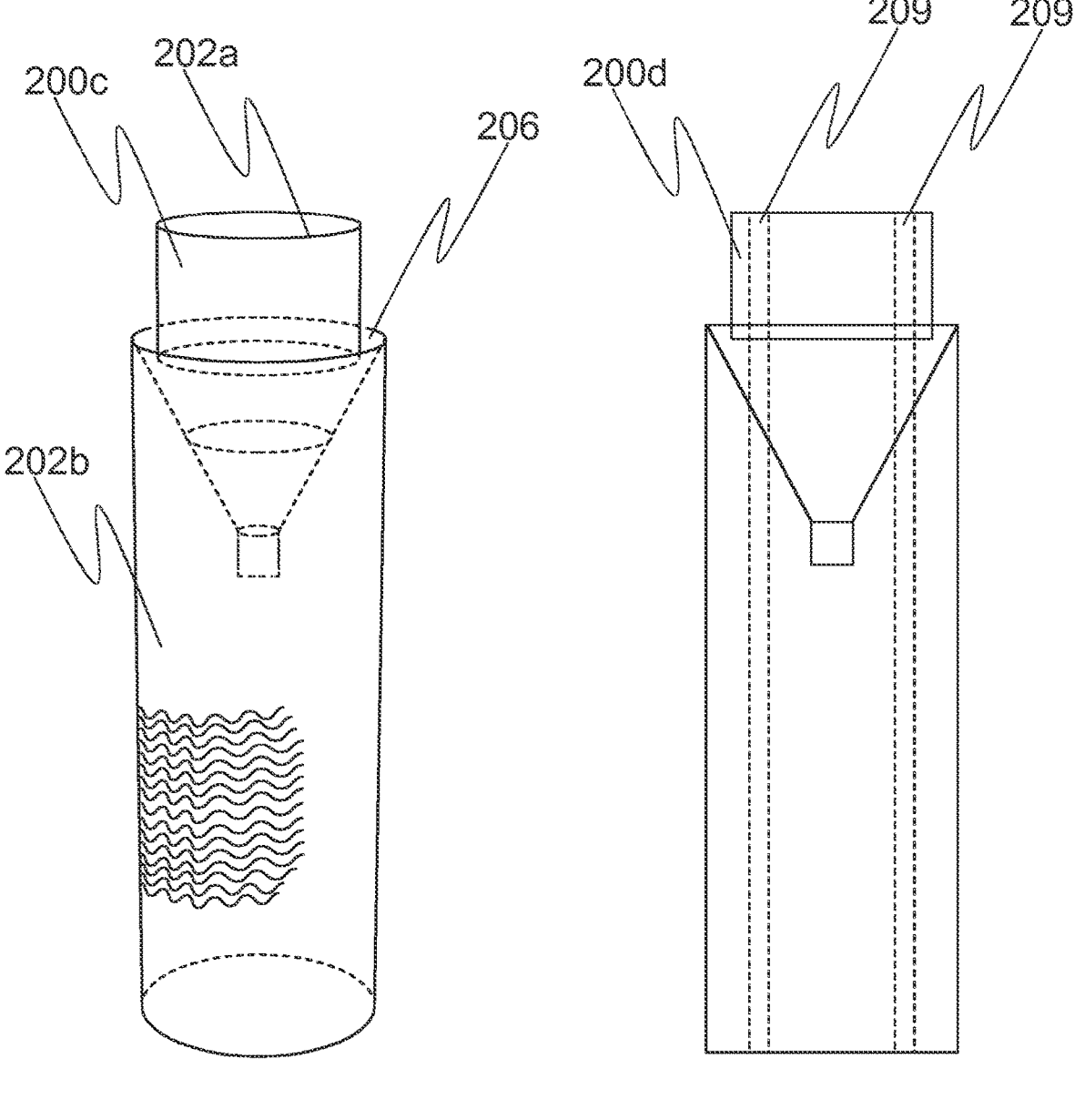
Figure 3:
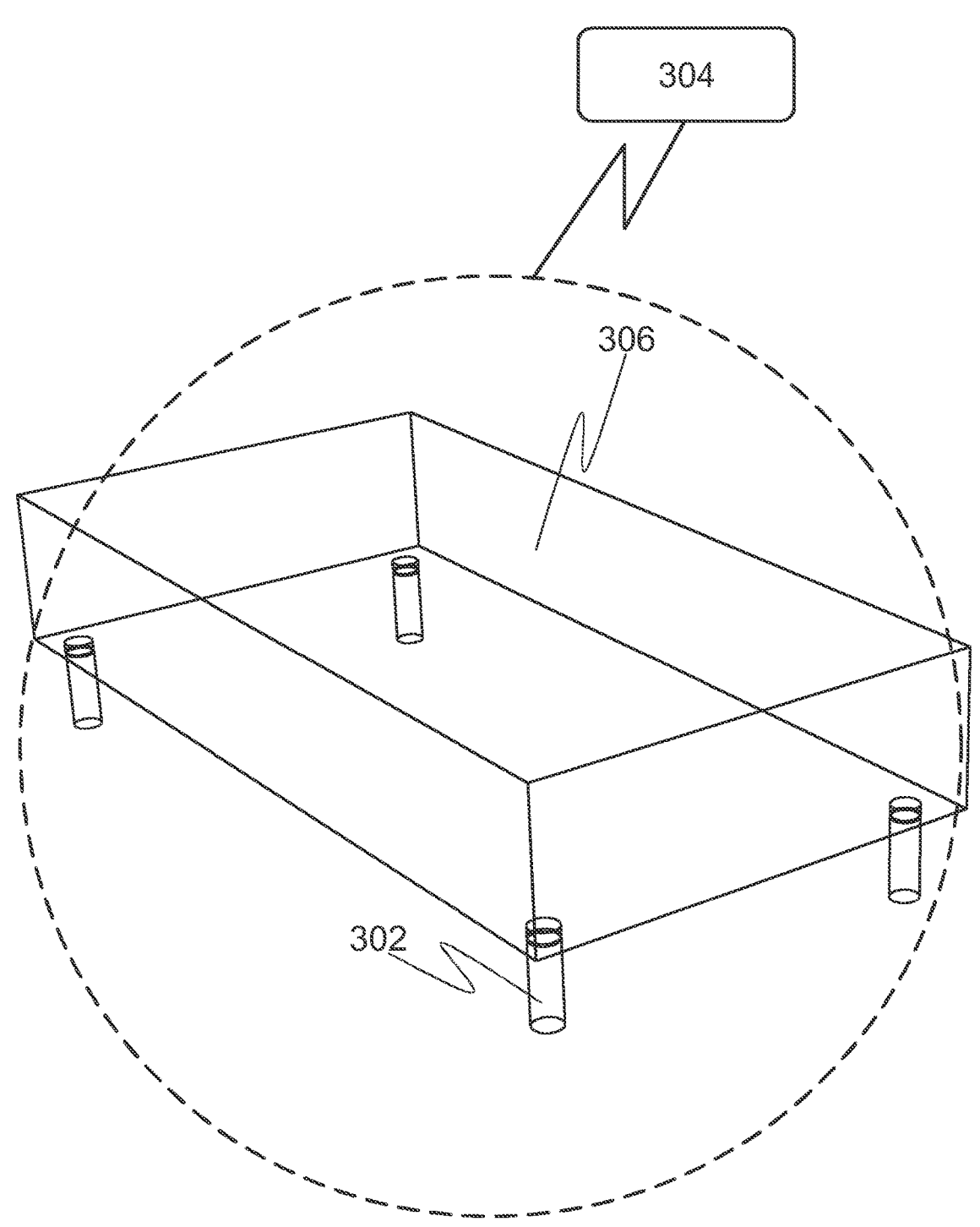
Figure 4:
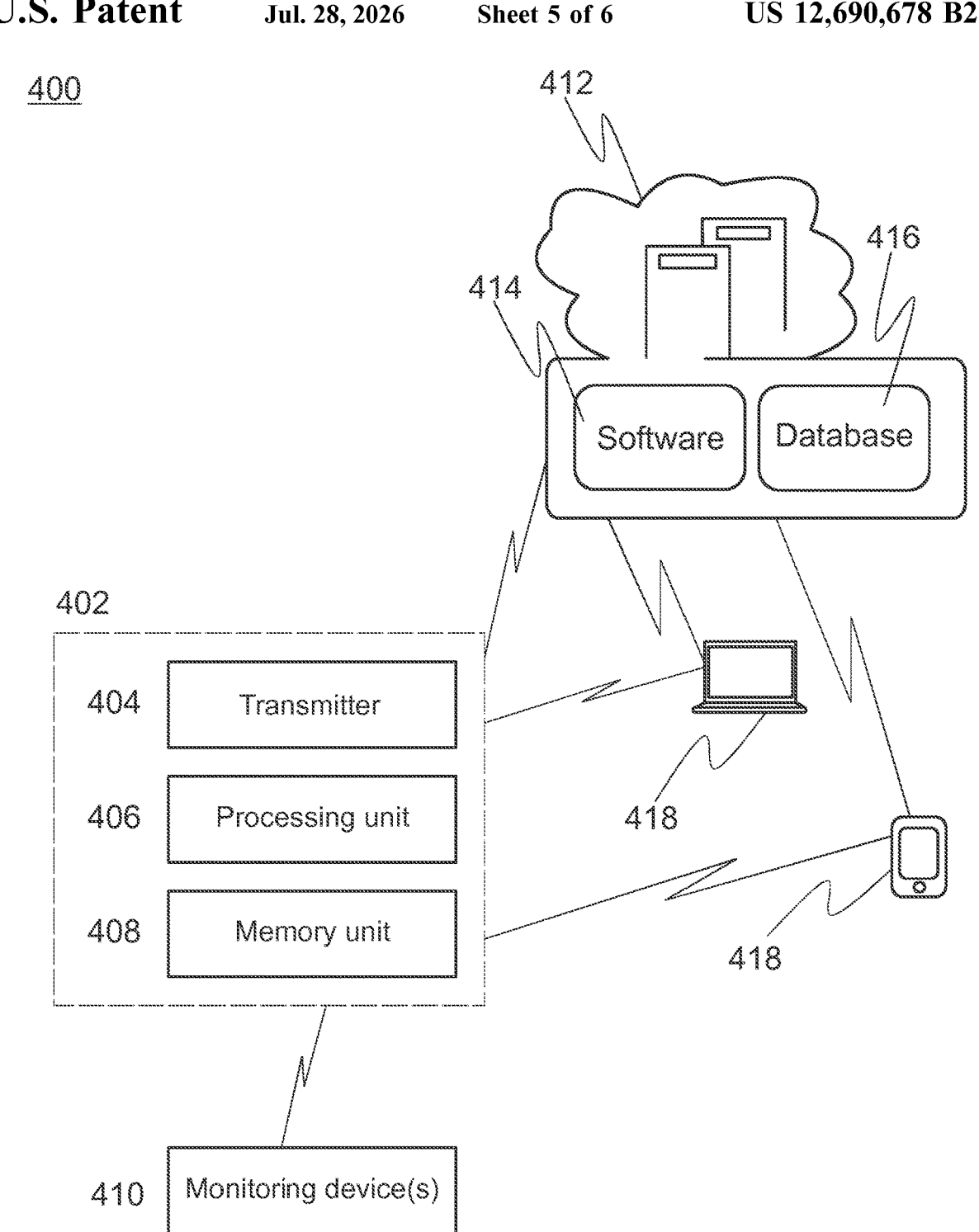
Figure 5:
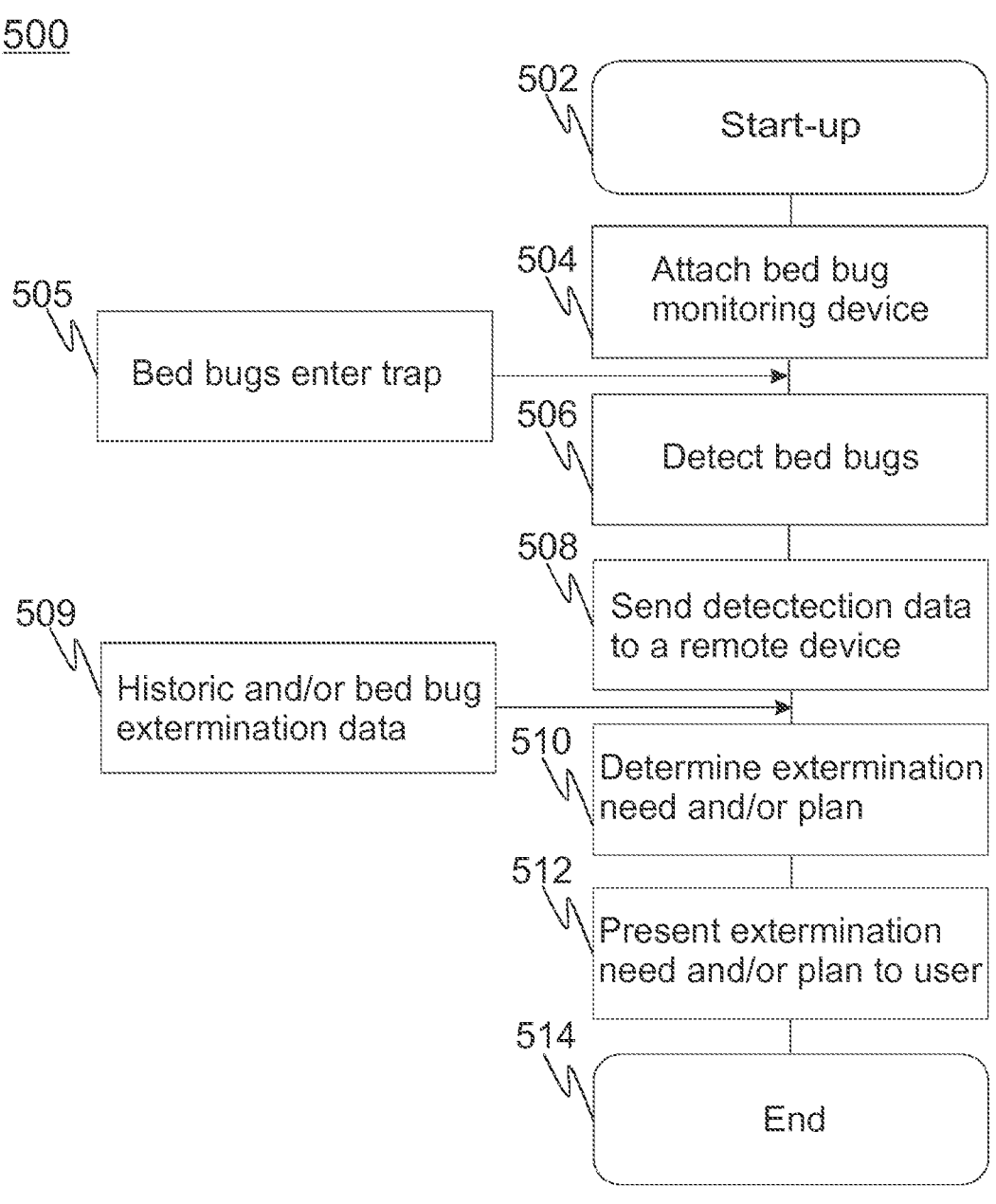

Next, some exemplary embodiments of the present invention are reviewed more closely with reference to the attached drawings, wherein FIG. 1 illustrates an embodiment of the bed bug monitoring device in accordance with the present invention, FIGS. 2a, 2b, 2c and 2d illustrate different features of embodiments of the bed bug monitoring device in accordance with the present invention, FIG. 3 illustrates an embodiment of the arrangement comprising a plurality of bed bug devices in accordance with the present invention, FIG. 4 illustrates an embodiment of the arrangement and remote communication thereof in accordance with the present invention, FIG. 5 is a flow diagram illustrating one feasible embodiment of the method in accordance with the present invention.

DETAILED DESCRIPTION OF THE EMBODIMENTS

FIG. 1 illustrates an embodiment of the bed bug monitoring device 100 in accordance with the present invention. The illustration is from a cross-sectional view.

The device 100 preferably comprises at least an elongated member 102, which preferably constitutes a furniture leg. The furniture leg may be utilized by a bed, table or chair, etc. The elongated member 102 may comprise two parts 102a, 102b. The two parts 102a, 102b may be separable and/or they may be fixed together. The elongated member may also be manufactured such that it comprises two parts 102a, 102b functionally separated by an opening although the two parts 102a, 102b are mechanically connected as part of one elongated member 102.

The feet of furniture are often preferred since they in many cases constitute the route, which the bed bugs use to travel to meal. Even further, especially the feet of a bed and other such furniture on which a person might spend their night on are good objects for the monitoring device 100 since the bed bugs are attracted the person and tend to move to feed during nighttime.

The elongated member 102 may comprise any shape of a furniture leg. The elongated member 102 may comprise an actual furniture leg or a structure for the purpose of the present solution and different features and embodiments thereof in mind. Clearly, the elongated member needn't be elongated e.g. in the sense of being taller than it is wide. To clarify the aforementioned, the term "elongated member" is herein used to refer to a piece of material that has at least suitable length for the trap 104, opening 106 and other features of the present invention thereof that are covered in detail hereinlater.

The material of the elongated member 102 may comprise wood, plastic, metal or other such materials commonly used with furniture legs. The material of the elongated member 102 may be chosen in relation to friction properties such that insects such as bed bugs may climb the surface of the elongated member 102.

The opening 106 is preferably formed to the side of the elongated member 102. Further it may situated between two parts 102a, 102b of the elongated member 102. The opening 106 preferably comprises a pathway via which the bed bugs may travel to the trap 104. The opening is preferably arranged wholly around the elongated member 102 such as that the outer surfaces of the upper part 102a and the lower part 102b are disconnected by the opening 106 in between them. The bed bugs are hence forced to travel from the top or bottom of the elongated member 102 to the trap 104 when they are trying to reach their pray or leaving it.

The opening 106 may be of any size in limitations of the device 100 geometry and the size and type of insects desired to capture in the trap 104. In accordance to some embodiments the opening 106 needn't extend wholly around the elongated member 102. In some embodiments the opening 106 may comprise other structures such as a small rim or elevated outline in the either side or vicinity of the opening 106, which structures may direct the movement of the bed bugs to the opening and/or along the pathway.

The opening 106 preferably comprises a pathway, which pathway comprises slippery surfaces such that bed bugs that enter the opening glide or otherwise are not able to climb the pathway. The pathway of the opening 106 is preferably also inclined such as that the bed bugs slide from the opening 106 down to the trap 104.

The trap 104 is situated essentially inside the elongated member 102. The trap 104 constitutes a container or a space to which the insects travel and are trapped. The trap 104 may comprise hard plastic that is also optionally slippery, which makes it more difficult for the bed bugs to move or exit the trap 104 after entering it.

The slippery surface material mentioned with the opening 106 pathway and trap 104 may comprise e.g. plastics with substantially non-porous surface or surface roughness that makes it very difficult or impossible for bed bug tarsi to cling onto. Such slippery surfaces may constitute plastics, glass, etc., and are known from the prior art and used widely in different kinds of insect traps. Other such slippery surfaces may comprise coated, lacquered and/or otherwise finished to slippery wood, metal, plastic, etc.

However, it is important to notice that there doesn't need to exist a separate pathway from the opening 106 to the trap 104. In some instances the opening 106 may lead straight to the trap 104 wherein the pathway may be construed as the walls of the trap 104. The walls of the trap need to be also therein inclined and slippery such that the bed bugs entering the opening slide to the trap.

As depicted, the elongated member 102 may comprise a top part 102a and a bottom part 102b, wherein the parts may be conical such that the top part 102a aligns inside the bottom part 102b. The parts 102a, 102b, may be aligned at the surfaces of the male cone (top part 102a) and female cone (102b), at the trap 104 and/or the vicinity of the trap 104. The adjacent surfaces of the parts 102a, 102b may comprise small structures and protrusions, such as grooves, dimples, domes, fins and/or other such structure that adjoin with the other surface leaving some space between the parts 102a, 102b for insects to travel. Clearly the opening 106 and the pathway to the trap may be also directly manufactured to the elongated member 102 structure without separable top part 102a and bottom 102b part. Such means of manufacturing comprise additive manufacturing means, casting and manufacturing means that remove material.

FIGS. 2a, 2b, 2c, 2d illustrate different features of embodiments of the bed bug monitoring device 200a, 200b, 200c, 200d in accordance with the present invention.

FIG. 2a illustrates that the outer surface of the elongated member may comprise a gripping surface, gripping shape(s), gripping pattern(s) or other such gripping structures 208. Such gripping structures 208 may be used to help the bed bugs travel more easily along the surface of the elongated member to the opening and consequently to the trap. Examples of such gripping structures 208 comprise plastic or fibrous material, which have substantially porous surface or surface roughness that enables higher friction between bed bug tarsi and the surface. The gripping structure 208 may comprise a protruded or stairwell-like shapes that may enable movement unidirectionally up or down (regardless of lateral movement) so that for example bed bugs coming from the floor up the elongated member may climb up the elongated member via the gripping structure 208 without being able to climb down (e.g. without dropping completely off the elongated member).

The outer surface of the elongated member may also comprise color that attracts bed bugs. This way the bed bug monitoring device 200a may not also acts as a trap that protects the user but as also a lure that attracts the insects for more efficient detection of their presence.

Further the elongated member may comprise means 207 for fixing the device 200a to furniture. Such means 207 may comprise screw threads, bolting, holes for screws or nails, and other such means well known in the prior art.

The trap may further comprise a chemical attractant that more efficiently lures the bed bugs into the trap. Chemical attractant may comprise e.g. carbon dioxide ($CO_2$). Similarly, visual lures may be used in connection with the trap to lure bed bugs into the trap. Both chemical attractant and visual lure may be inside or outside the trap. The trap may further comprise materials and/or structures to which the trapped bed bugs stuck to. Further the trap may comprise materials and/or structures that exterminate the bed bugs that enter the trap.

FIG. 2b illustrates an embodiment 200b of the monitoring device wherein the trap 204 comprises a removable part 205. The container or such part 205 of the trap 204 may hence be removed for convenient visual inspection and emptying of insects from the trap 204. The visual inspection may be e.g. used for confirming that the detection is actually caused by bed bugs or by any insects at all.

Further, the 204 preferably has slippery surface at least on the inner surfaces of the trap 204 housing. This enables that the bed bugs may enter the trap 204 along the pathway and the opening(s) but not exit the trap 204 since the trap 204 inside walls are slippery and non-climbable for the bed bugs. Such slippery surfaces may constitute plastics, glass, etc., and are known from the prior art and used widely in different kinds of insect traps.

The trap 204 may further comprise sensor means that detect the presence of an insect, such as a bed bug, inside or in the vicinity (pathway) of the trap 204. Such sensors may comprise led emitter-detector arrangement wherein the shadows of the bed bugs may be detected and hence bed bugs in the trap 204 recognized. Another example of such sensor means comprises passive infrared (IR) detection wherein the heat signals of bed bugs may be detected. One other sensor means comprises utilizing visual imaging means, such as a camera. The visual imaging of the camera may be sent out of the device 200 and the imaging may be provided to users for visual inspection for bed bugs. The sensor means may comprise microelectromechanical system (MEMS) sensor means such as a proximity sensor or an ultrasonic sensor that e.g. measures the distance between the bottom of the trap 204 and top of the trap 204 (presence and increase in the amount of bed bugs in the trap 204 may be used to determine their presence and estimate their quantity) or to detect occurring presence(s) in or in the vicinity of the trap 204 caused by bed bugs entering the initially empty trap 204. However, a myriad of means may be utilized in accordance with the known presence and proximity sensor means as well as MEMS solutions.

Similarly, the sensor means for detecting the presence of an insect may be also situated in or in the vicinity of the trap 204 such that insects outside the trap e.g. in the pathway and/or on the elongated member 202 may be detected.

Further although not explicitly illustrated the device 200*b* may comprise an indicator that indicates when bed bugs have entered the trap 204. Such indicator may comprise a light emitting diode (LED) arrangement, such as a strip of LEDs or a LED lamp that turns on or gives out a certain colored light in case bed bugs are detected. In case of larger arrangements of monitoring devices 200 the aforementioned light arrangement makes it more convenient and efficient to detect where bed bugs have been detected.

FIG. 2*c* illustrates an embodiment of the monitoring device 200*c* wherein the elongated member comprises two parts 202*a*, 202*b*, which are different in shape and size. Further, in this embodiment the opening 206 faces essentially to the top of the elongated member. Clearly, the opening 206 may be situated, shaped and directed in many different ways.

FIG. 2*d* illustrates an embodiment of the monitoring device 200*c* wherein the parts of the elongated member are connected to each other by supports 209. These kinds of supports may be used in any of the embodiments 200*a*, 200*b*, 200*c*, 200*d*. The supports are set such that a space is left between the upper part and lower part of the elongated member via which space the bed bugs may enter the trap.

FIG. 3 illustrates an embodiment of the arrangement (300) comprising a plurality of bed bug devices in accordance with the present invention.

In the FIG. 3, four bed bug monitoring devices 302 (only one has been marked with a reference number) have been attached as the legs of a bed 306. Attaching the devices 302 as the legs of a bed is a preferable embodiment because people spend their night sleeping in the bed, which is also a preferred time and location for the bed bugs to travel to feed on the people on the bed.

The monitoring devices 302 preferably comprise sensor means that have been arranged to detect the presence of an insect in or in the vicinity of the trap of a device 302. Further, the monitoring devices 302 have been arranged to send signals towards a remote entity, mobile device, terminal or other communication module 304 at least when bed bugs have been detected. The monitoring devices may hence comprise at least transmitting means, such as short range communication means, automatic identification and data capture (AIDC) means, such as Bluetooth, computer networking means, such as wireless local area network (WLAN) means. Optionally the monitoring devices 302 may be also arranged to send signals that the detection device is working and/or the power level of the device 302. Clearly, the monitoring devices 302 may be arranged to send data of their state and detection data (even when no bedbugs are detected) in real-time and/or in intervals. The communication module 304 may be an external device to the monitoring devices 302 or it may be integrated to one. The communication module 304 may receive the signals of detected bed bugs by-wire and/or wirelessly. Similarly the monitoring devices 302 may be connected and arranged thereof to send said signals at least towards the communication module 304. The monitoring devices 302 hence may but needn't comprise transmitters in case they are connected by wires and/or conductors to the communication module 304. However, the transmitter means as well as suitable processing and memory means enable a myriad of internet of things (IoT) capabilities for the monitoring device(s) 302.

The communication module 304 comprises at least a transmitter, which is preferably wireless. The transmitter may be arranged to send information towards a remote entity, terminal or mobile device essentially real-time or only in case detection signals by monitoring devices 302 are received. Alternatively, the communication module comprises a transceiver, which can receive and/or send information by-wire or wirelessly.

The arrangement 300 may also point out, which monitoring device 302 has detected bed bugs after which the particular monitoring device may be e.g. visually inspected for confirming the detection.

The communication module 304 is preferably used to at least primarily collect status and/or detection information from the monitoring devices 302. The communication module may constitute a base station for the monitoring devices 302 via which they send data to external devices.

FIG. 4 illustrates an embodiment of the arrangement 400 and remote communication thereof in accordance with the present invention.

The arrangement 400 may for example constitute or be utilized in a setting wherein a hotel employee monitors remotely multiple monitoring devices 410 set in multiple rooms of a hotel, which communication is relayed via a communication module 402 e.g. set in one floor to communicate with monitoring devices 410 in different rooms of the floor. Hence, the employee may detect which rooms seem to be clear and essentially real-time if bed bugs are detected. This enables for very efficient monitoring of large complexes from one location and from a simple user device, such as a mobile terminal. Similarly, the arrangement may be used in smaller scale, such as in a single household. The ramifications of the arrangement 400 are that the scale can be set so that the monitoring devices tracked remotely needn't be in any kind of connection with each other and they may be located in totally different places and the user may still pinpoint the state of each individual monitoring device.

The arrangement 400 comprises the communication module 402 comprising a transmitter 404 and optionally processing unit 406 and memory unit 408. Alternatively, the transmitter 404 may be a transceiver. The transceiver may comprise e.g. e.g. network card, transceiver chip, cellular module, etc., which may optionally facilitate wireless communication. The processing unit 406 may be a microprocessor, such as a digital signal processor (DSP) or digital signal controller (DSC), arranged to receive, process and/or convert signals into preferred form. The memory unit 404 may be used to support the functionalities of the processing unit 406 and store log information, and information sent and/or received by the communication module 402. The communication module is arranged to at least receive signals from a number of monitoring devices 410 and to send said received signal or data representative data thereof to a remote entity 412, such as a cloud, and/or to personal computing devices 418, such as mobile devices and laptops.

The remote entity 412 comprises at least the software program 414 used to process the signals sent by the communication module 402. Further, the processed data may be stored into a database 416. The software program 414 and/or the database 416 contents may be provided to the personal computing devices. This way monitoring devices and bed bug infestation thereof may be tracked remotely by the users on personal computing devices 418. The communication module may be arranged to send monitoring device 410 information essentially real-time to the remote entity enabling for real-time monitoring.

The personal computing devices 418 may comprise a mobile or web application for tracking the monitoring devices 410. Optionally the software may be provided as software as a service (SaaS) from the remote entity 412. Said application preferably utilizes at least partly the database 416 contents so that the user may track and save the progress of an infestation through time.

Optionally the user may communicate with the remote entity 412 using the personal computing device 418 to receive and share other information, such as user manual, configuration information, location information and status information pertaining to the monitoring devices 410. Further, information such as instructions to exterminate or ordering of extermination to a location may be carried out.

It is also possible that the communication module constitutes or is comprised in a device, which further comprises the means to provide a reading of the received, and optionally processed, signals to a user e.g. via a display or other user interface means. Such a device may constitute an in-situ reader device for the monitoring devices 410.

The arrangement may utilize or be utilized in IoT networks and ecosystem, such as the Nest application. Further, it may utilize open source means and applications, such as Reality Editor.

FIG. 5 is a flow diagram illustrating one feasible embodiment of a method (500) in accordance with the present invention.

At 502, referred to as start-up, the arrangement and devices thereof may be configured. The parameters for the sensors may be set for instance. Also, at this point the location and object(s) that are set under monitoring are chosen.

At 504, a bed bug monitoring device is arranged to a piece of furniture. The bed bug monitoring device is preferably a trap device for bedbugs that comprises sensor means to detect the trapped bedbugs and which preferably comprises also transmitting means to send said detection data to other devices.

The trap at least comprises an opening and a space in which they trap once they walk in from the opening. The trap is preferably used to trap and detect bed bugs but said trapping isn't always mandatory. The trap may in some instances be only used to monitor bed bugs travelling through thereof.

At 505 bed bugs travel into or to the vicinity of the trap. This may be e.g. during nighttime as a person sleeps or spends time on the piece of furniture to which the monitoring device has been arranged to.

At 506, the bed bugs are detected.

At 508, the detection signal or representative data is sent towards a remote entity, such as a remote server, electronic monitoring unit or personal computing device.

At 510, the user or software at the remote entity may monitor, process and save the information to determine the type and/or amount of the bed bugs. The remote entity may also utilize historic data about the monitored bed bugs and their extermination as depicted at 509. Consequently, a corresponding action for extermination may be determined in relation to the type and/or amount of the bed bugs.

At 512, the action for plan or other information relating to the type, amount and/or extermination may be further shared with users and or contractors to take action and move forward with the extermination or related functions.

At 514, referred to as end, the method may be repeated e.g. such that the monitoring of bedbugs in the object and location is continued to assess the infestation after the extermination. The method may be also ended such that the monitoring of bedbugs is moved to another object and location.

The scope of the invention is determined by the attached claims together with the equivalents thereof. The skilled persons will again appreciate the fact that the disclosed embodiments were constructed for illustrative purposes only, and the innovative fulcrum reviewed herein will cover further embodiments, embodiment combinations, variations and equivalents that better suit each particular use case of the invention.

The invention claimed is:

1. A monitoring device for insects, comprising:
an elongated member constituting a furniture leg, wherein said elongated member comprises:
a space inside the elongated member comprising a trap for insects,
at least one opening in the elongated member wherein insects may enter the trap,
the opening being connected to the trap by a pathway that is inclined and slippery such that the bed bugs entering the opening slide to the trap,
wherein outer surface of the elongated member comprises a gripping surface, one or more gripping shapes, one or more gripping patterns, or one or more gripping structures which allow the bed bugs to travel more easily along the surface of the elongated member to the opening and consequently to the trap and wherein the trap has slippery surface on one or more inner surfaces of the trap.

2. The monitoring device of claim 1 wherein the opening extends around the elongated member and disconnects an outer surface of the elongated member into two outer surfaces.

3. The monitoring device of claim 1 wherein the trap comprises a part, which is removably fixed to the elongated member.

4. The monitoring device of claim 1 wherein the elongated member comprises an upper part and a lower part, the upper part and the lower part being removable from each other.

5. The monitoring device of claim 1 wherein the elongated member comprises an attractant color or scent on a surface of the elongated member.

6. The monitoring device of claim 1 further comprising at least one gripping structure on a surface of the elongated member, wherein the at least one gripping structure is configured to enable unidirectional movement along the elongated member.

7. The monitoring device of claim 1 further comprising sensor means for detecting the presence of an insect inside or in the vicinity of the trap.

8. The monitoring device of claim 7 further comprising a transmitter to send signals of detected insects, optionally to a mobile device or a remote entity.

9. The monitoring device of claim 1 further comprising an indicator for signaling a detected insect inside the trap.

10. An arrangement for monitoring insects, comprising:
at least one bed bug monitoring device, comprising means to detect bed bugs, said monitoring device being situated as a leg of a piece of furniture; and
a communication module comprising means to obtain detection signals from said bed bug monitoring device and further to send said signals towards a remote entity, wherein an outer surface of the leg comprises a gripping surface, one or more gripping shapes, one or more gripping patterns, or one or more gripping structures which allow the bed bugs to travel more easily along the surface of the elongated member in a direction towards the monitoring device.

11. The arrangement of claim 10 further comprising a mobile device, computer terminal or remote server, arranged to obtain the detection signals and to determine a type and/or an amount of the bed bugs and/or to determine an action for extermination.

12. The arrangement of claim 10 wherein the at least one bed bug monitoring device comprises a plurality of bed bug monitoring devices, wherein the plurality of bed bug monitoring devices are arranged as all of a plurality of feet or stands of furniture, such as a bed, a table, or a chair.

13. A method for monitoring bed bugs comprising:
attaching a bed bug monitoring device as a leg of a piece of furniture, such as that bed bugs cannot travel along said leg to or from the piece of furniture without being trapped in said monitoring device,
detecting the bed bugs traveling to or caught in the monitoring device,
sending data or a signal representing information about the detected bed bugs towards a remote device,
wherein an outer surface of the leg comprises a gripping surface, one or more gripping shapes, one or more gripping patterns, or one or more gripping structures which allow the bed bugs to travel more easily along the surface of the elongated member in a direction towards the monitoring device.

\* \* \* \* \*